United States Patent
Gotoh

(10) Patent No.: US 11,408,748 B2
(45) Date of Patent: Aug. 9, 2022

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventor: Hikaru Gotoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 17/021,202

(22) Filed: Sep. 15, 2020

(65) Prior Publication Data

US 2021/0080277 A1 Mar. 18, 2021

(30) Foreign Application Priority Data

Sep. 18, 2019 (JP) .............................. JP2019-169509

(51) Int. Cl.
*G01C 21/34* (2006.01)
(52) U.S. Cl.
CPC ..... *G01C 21/3492* (2013.01); *G01C 21/3476* (2013.01)
(58) Field of Classification Search
CPC .......................... G01C 21/343; G01C 21/3492
See application file for complete search history.

(56) References Cited

U.S. PATENT DOCUMENTS

| 6,101,443 A * | 8/2000 | Kato ................. | G01C 21/3415 340/995.21 |
|---|---|---|---|
| 2001/0020211 A1* | 9/2001 | Takayama .......... | G01C 21/3626 701/410 |
| 2003/0187573 A1* | 10/2003 | Agnew .............. | G01C 21/3492 701/414 |
| 2004/0249568 A1* | 12/2004 | Endo .................. | G01C 21/3691 701/410 |
| 2006/0241862 A1* | 10/2006 | Ichihara ............... | G01C 21/343 701/533 |
| 2008/0004794 A1* | 1/2008 | Horvitz ................. | G01C 21/34 701/414 |
| 2014/0129121 A1* | 5/2014 | Fino .................... | G01C 21/3492 701/117 |
| 2017/0219365 A1* | 8/2017 | Zhou .................. | G01C 21/3469 |
| 2017/0261330 A1* | 9/2017 | Zhou .................... | G01C 21/343 |
| 2018/0136003 A1* | 5/2018 | Perkins ............... | G01C 21/362 |
| 2018/0336779 A1* | 11/2018 | Yeh ..................... | G01C 21/3492 |
| 2019/0195639 A1* | 6/2019 | Malewicz ............ | G06Q 10/047 |
| 2020/0011690 A1* | 1/2020 | Becker ............... | G01C 21/3679 |

(Continued)

FOREIGN PATENT DOCUMENTS

JP 2011-242228 A 12/2011

*Primary Examiner* — Ryan Rink
(74) *Attorney, Agent, or Firm* — Sughrue Mion, PLLC

(57) ABSTRACT

An information processing apparatus comprises a storage unit configured to store congestion information for each road link by time zone; and a control unit configured to obtain information about a departure place, a destination and an arrival deadline from a user, and to determine a route connecting between the departure place and the destination and a movement schedule including a departure time and an estimated arrival time; wherein the control unit determines the movement schedule that allow a user to arrive at the destination by the arrival deadline and to move through the route in a required time shorter than a predetermined value set for each route.

14 Claims, 12 Drawing Sheets

(56) References Cited

U.S. PATENT DOCUMENTS

| | | | |
|---|---|---|---|
| 2020/0096355 A1* | 3/2020 | Mishina | G05D 1/0285 |
| 2020/0290647 A1* | 9/2020 | Anderson | G08G 1/091 |
| 2020/0334987 A1* | 10/2020 | Shoval | G06Q 50/30 |
| 2021/0063184 A1* | 3/2021 | Heinisch | G01C 21/206 |
| 2021/0293555 A1* | 9/2021 | Roherty | G01C 21/3697 |
| 2021/0293573 A1* | 9/2021 | Sofman | G01C 21/3697 |

\* cited by examiner

CONGESTION DATA TABLE

| DATA ID | LINK ID | AVERAGE SPEED | DAY OF THE WEEK | TIME ZONE |
|---|---|---|---|---|
| 001 | A | 12km/h | WEEKDAY | 8:00-8:10 |
| 002 | A | 14km/h | WEEKDAY | 8:10-8:20 |
| 003 | A | 18km/h | WEEKDAY | 8:20-8:30 |
| 004 | A | 18km/h | WEEKDAY | 8:30-8:40 |
| 005 | A | 18km/h | HOLIDAY | 8:00-8:10 |
| 006 | B | 16km/h | WEEKDAY | 8:00-8:10 |
| 007 | ... | ... | ... | ... |
| ... | ... | ... | ... | ... |

FIG. 3A

ROAD DATA TABLE

| DATA ID | LINK ID | STANDARD REQUIRED TIME | DISTANCE |
|---|---|---|---|
| 001 | A | 2'15" | 1100m |
| 002 | B | 1'00" | 500m |
| 003 | C | 3'20" | 1650m |
| 004 | D | 3'05" | 1530m |
| 005 | E | 2'50" | 1410m |
| 006 | F | 6'10" | 3000m |
| 007 | ... | ... | ... |
| ... | ... | ... | ... |

FIG. 3B

ROAD DATA TABLE

| DATA ID | LINK ID | STANDARD REQUIRED TIME | DISTANCE | NUMBER OF LANES | ROAD WIDTH | SIDEWALK |
|---|---|---|---|---|---|---|
| 001 | A | 2'15" | 1100m | 2 | 18m | PRESENCE |
| 002 | B | 1'00" | 500m | 1 | 12m | ABSENCE |
| 003 | C | 3'20" | 1650m | 2 | 25m | PRESENCE |
| 004 | D | 3'05" | 1530m | 2 | 15m | PRESENCE |
| 005 | E | 2'50" | 1410m | 2 | 20m | PRESENCE |
| 006 | F | 6'10" | 3000m | 3 | 30m | PRESENCE |
| 007 | ... | ... | ... | ... | ... | ... |
| ... | ... | ... | ... | ... | ... | ... |

FIG. 11

INFORMATION PROCESSING DEVICE, INFORMATION PROCESSING METHOD, AND STORAGE MEDIUM

CROSS REFERENCE TO RELATED APPLICATION

This application claims the benefit of Japanese Patent Application No. 2019-169509 filed on Sep. 18, 2019 which is hereby incorporated by reference herein in its entirety.

BACKGROUND

Technical Field

The present disclosure relates to a technique for generating a movement or traveling plan.

Description of the Related Art

There is a system that searches for a route requiring the shortest time in traveling by an automobile. In addition, there is a system that stores traffic jam or congestion information for each time zone, and calculates an optimal route and a required time according to a scheduled departure time and a desired arrival time. Traffic congestion conditions change every moment, so an appropriate route can be obtained by considering time zones (times of day) to travel.

For example, Patent Literature 1 discloses a navigation system that obtains a plurality of routes by performing route search while shifting a departure time, and switches a recommended route in accordance with the current time during traveling.

CITATION LIST

Patent Literature

Patent Literature 1: Japanese Patent Application Laid-open Publication No. 2011-242228

SUMMARY

In conventional navigation devices, the fastest route to travel can be obtained based on a departure time and a desired arrival time inputted by a user, but there is room for improvement from the viewpoint of proposing a schedule itself for comfortable travel.

The present disclosure has been made in consideration of the problem as referred to above, and has for its object to provide a user with an appropriate movement or travel schedule.

A first aspect of the present disclosure is an information processing apparatus that determines a movement schedule to be provided to a user.

Specifically, the apparatus includes: a storage unit configured to store congestion information for each road link by time zone; and a control unit configured to obtain information about a departure place, a destination and an arrival deadline from a user, and to determine a route connecting between the departure place and the destination and a movement schedule including a departure time and an estimated arrival time; wherein the control unit determines the movement schedule that allows a user to arrive at the destination by the arrival deadline and to move through a route in a required time shorter than a predetermined value set for each route.

A second aspect of the present disclosure is an information processing method that is performed by the above-mentioned information processing apparatus.

Specifically, the method includes: an obtaining step configured to obtain congestion information for each road link by time zone; and a determining step configured to obtain information about a departure place, a destination and an arrival deadline from a user, and to determine a route connecting between the departure place and the destination and a movement schedule including a departure time and an estimated arrival time; wherein in the determining step, a movement schedule is determined that allows a user to arrive at the destination by the arrival deadline and to move through the route in a required time shorter than a predetermined value set for each route.

In addition, as a further aspect, there is mentioned a program for causing a computer to execute an information processing method performed by the above-mentioned information processing apparatus, or a computer readable storage medium having the program stored therein in a non-transitory manner.

According to the present disclosure, an appropriate movement schedule can be provided to a user.

BRIEF DESCRIPTION OF THE DRAWINGS

FIGS. 3A and 3B are examples of congestion data and road data, respectively, stored in a storage unit.

FIG. 11 is an example of road data in the fourth embodiment of the present disclosure.

DESCRIPTION OF THE EMBODIMENTS

Figure 1:
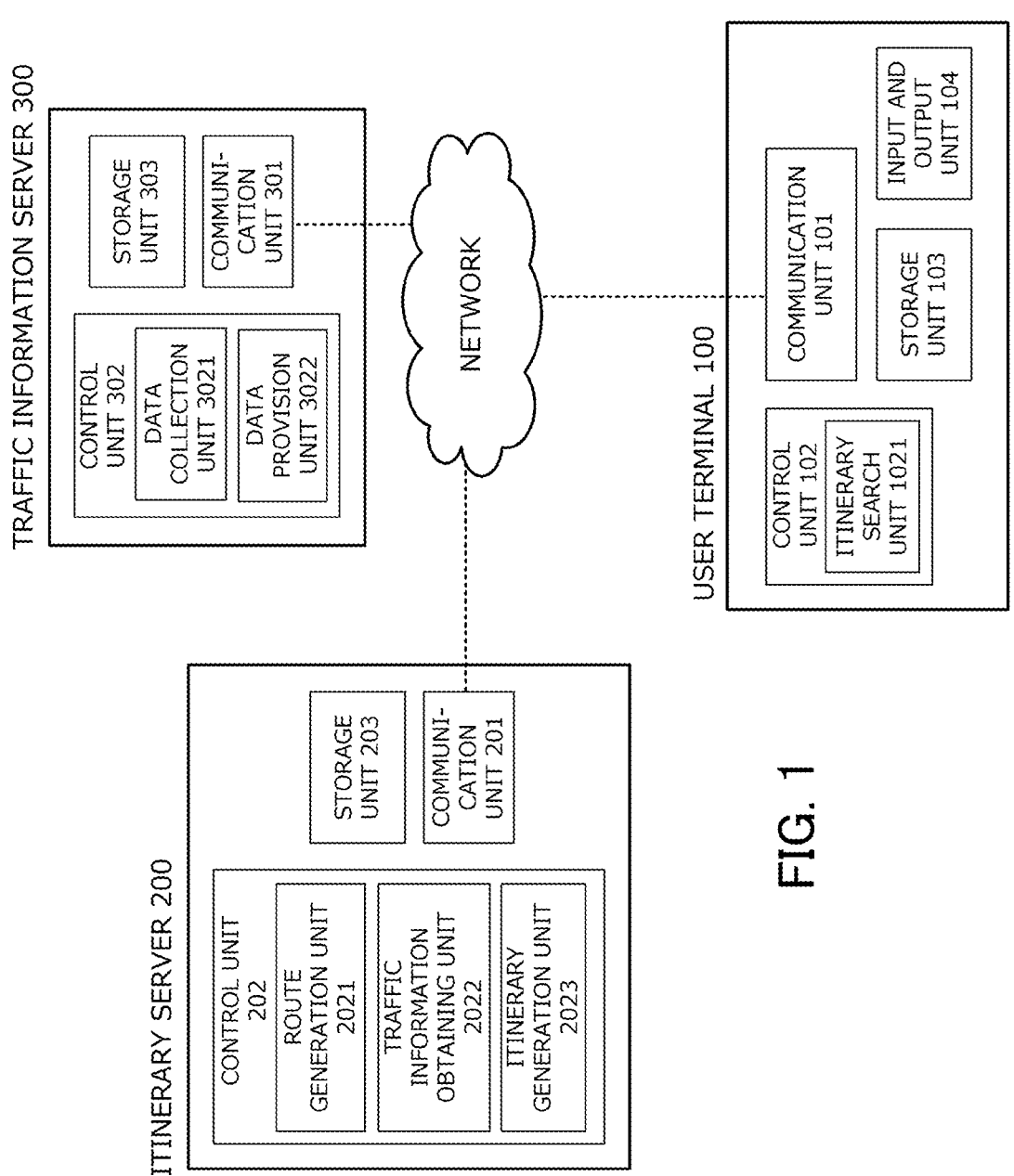
FIG. 1 is a configuration view of a navigation system according to a first embodiment of the present disclosure.

Navigation devices that propose an optimal route to a user in consideration of traffic congestion conditions have been widely spread. For example, some of such devices may calculate a required time based on real-time traffic congestion information, or may calculate, based on past traffic congestion information, a required time at the time when a user will depart at a specified time.

On the other hand, in such navigation devices, it is possible to obtain a movement (or travel) schedule that enables a user to depart from a departure place at a specified time or arrive at a destination at a specified time, but it is not possible to search for a movement schedule that enables a user to move or travel as comfortably as possible within acceptable tolerances.

For example, a case is considered where a user moves or travels by car so as to arrive at work by 7:55 in the morning. Here, it is assumed that it takes 45 minutes to pass through a route during commuting hours while the user can usually arrive at work through the route by car in 30 minutes.

In this case, a conventional navigation device generally outputs a movement schedule in which a user departs at about 07:10, and arrives at about 07:55. However, even in cases where it is possible to avoid a busy time zone by advancing a departure time by 10 minutes (e.g., in cases where it is possible to arrive at in 35 minutes), this cannot be proposed by the conventional navigation device. If the user is allowed to leave 10 minutes earlier, a loss of 10 minutes due to traffic congestion can be reduced.

In this embodiment, an information processing apparatus capable of obtaining such a movement or travel schedule is provided.

Here, note that in the following description, the term "movement schedule" or "travel schedule" includes a combination of a departure time and an estimated arrival time for a route.

The term "route" may include multiple trips.

The term "trip" used in this specification is a unit of movement or trip that includes a start point and an end point. For example, in the case of moving or traveling to and from a certain destination, an outward trip and a return trip can each be set as one trip. In this case, a route to travel to and from the destination includes two trips. In addition, if there are stopover points along the route, the trip can be divided or segmented at these stopover points.

If the route includes multiple trips, the times associated with the multiple trips may be collectively referred to as a movement schedule. Also, the term "itinerary" as used in this specification refers to a combination of a route connecting between a departure place and a destination, and a movement schedule.

In the information processing apparatus, a storage unit stores congestion information for each road link by time zone, and a control unit obtains information about a departure place, a destination and an arrival deadline from a user, and determines a route and a movement schedule including a departure time and an estimated arrival time. In addition, at the time of determining the movement schedule, a movement schedule for enabling a user to move through the route in a required time shorter than a predetermined value set for each route is selected from among those movement schedules that allows the user to arrive at the destination by the arrival deadline.

The predetermined value set for each route is a threshold value of the required time that can be recommended to the user in the route. For example, when 30 minutes is set as a threshold value for a target route, a movement schedule that enables the user to move through the route within 30 minutes or less is searched for. In other words, a movement schedule in which the required time exceeds 30 minutes is determined to be inappropriate and not adopted. Such a threshold value may be determined based on a standard required time in the route (a travel time when there is no traffic jam or congestion). That is, a movement schedule may be adopted on the condition that an increase in the required time due to a traffic jam is equal to or less than a predetermined value.

Thus, the information processing apparatus according to the present embodiment can obtain a movement schedule with priority given to the reduction of labor required for a driver under the constraint that the driver arrives at the destination by the arrival deadline.

In addition, the predetermined value may be characterized by being determined based on the standard required time corresponding to the route. The predetermined value may be, for example, a value that is obtained by adding a certain rate such as 10%, 15% or the like to the standard required time.

Moreover, the control unit may be characterized by determining the movement schedule in such a manner that the departure time and the estimated arrival time fall within a predetermined time range ending at the arrival deadline.

The predetermined time range can be specified by the user, for example. Having the range in time will allow the user to search for an optimal movement schedule.

Further, the control unit may be characterized by being configured to obtain a candidate of the movement schedule with the arrival deadline as the estimated arrival time, and to advance, when the required time obtained exceeds the predetermined value, the departure time until the required time becomes less than the predetermined value.

According to such a configuration, it is possible to obtain a movement schedule in which the arrival time can be close to the deadline and traffic congestion can be avoided.

Furthermore, the control unit may be characterized by obtaining the candidate of the movement schedule, and calculating the required time corresponding to the candidate of the movement schedule using the traffic congestion information.

By referring to traffic congestion information by time zone, it is possible to perform an accurate prediction of the required time.

Still further, the control unit may be characterized by giving an evaluation value to the candidate based on the required time calculated.

Additionally, the control unit may also be characterized by adopting the candidate of the movement schedule for which the evaluation value is equal to or greater than a predetermined value.

For example, the shorter the required time, the higher may be the evaluation value. In cases where the route includes a plurality of trips, the evaluation value may be calculated based on a sum total value of their required times.

In addition, the route may be characterized by including a first trip and a second trip, and the control unit may be characterized by being configured to give a higher evaluation value to the candidate as an interval between the first trip and the second trip is longer.

Further, the control unit may also be characterized by being configured to give a higher evaluation value to the candidate as a sum total of times required for the first trip and the second trip is shorter.

According to such configurations, it is possible to maximize a stay time in the case of assuming that the first trip is an outward trip and the second trip is a return trip. That is, it becomes possible to obtain a movement schedule in which a driving time is shorter and the stay time is longer.

Moreover, the control unit may be characterized by obtaining a candidate of the route, and giving a second evaluation value to the candidate of the route based on a plurality of evaluation criteria.

The evaluation criteria may be any conditions as long as they are related to the difficulty of driving or the effort or labor involved in driving and they can vary depending on the route and time zone.

For example, as something that can vary depending on the route, there can be mentioned the number of lanes, the width of roads, the presence or absence of sidewalks, the values calculated based on these, etc. Also, as something that can vary depending on the time zone (time of day), there can be mentioned the volume of traffic, the presence or absence of sunshine, the time of sunrise or sunset, the estimated amount of rainfall, etc.

By using the evaluation criteria, it will be possible to obtain a movement schedule that allows the user to drive more easily.

Further, the control unit may be characterized by being configured to assign a weight to each of the plurality of evaluation criteria based on a user's specification.

According to such a configuration, it will be possible to determine a route and a movement schedule that meet the user's preferences.

Furthermore, the control unit may be characterized by presenting a result of the evaluation based on the plurality of evaluation criteria to the user.

By presenting the evaluation to the user, the user can select a more preferable route and/or movement schedule.

First Embodiment

An outline of a navigation system according to a first embodiment will be described with reference to FIG. 1, which is a system configuration view. The navigation system according to this embodiment is configured to include a terminal (user terminal 100) owned by a user, an itinerary server 200 that provides navigation services to the user terminal 100, and a traffic information server 300 that provides road traffic information (traffic jam or congestion information).

Here, note that in cases where there are a plurality of users using the system, there may be a plurality of user terminals 100. In addition, a plurality of traffic information servers 300 may be provided for each area (or each road administrator).

The user terminal 100 is a small computer such as for example a smart phone, a mobile phone, a tablet computer, a personal information terminal, a notebook computer, or a wearable computer (a smart watch, etc.). The user terminal 100 is configured to include a communication unit 101, a control unit 102, a storage unit 103, and an input and output unit 104.

The communication unit 101 is a communication interface for communicating with the itinerary server 200 via a network.

The control unit 102 is a unit configured to control the user terminal 100. The control unit 102 is composed of, for example, a CPU (Central Processing Unit).

The control unit 102 has an itinerary search unit 1021 as a functional module. The functional module may be realized by executing a program stored in a storage unit such as a ROM (Read Only Memory) by the CPU.

The itinerary search unit 1021 transmits a request for searching for an itinerary (hereinafter, an itinerary search request) to the itinerary server 200, and guides the user about the itinerary based on a response obtained. More specifically, the itinerary search unit 1021 obtains a departure place and a destination from the user, and transmits to the itinerary server 200 a request to search for a route connecting between the departure place and the destination and an optimal movement schedule for moving on the route. Further, the itinerary received from the itinerary server 200 is provided to the user through the input and output unit 104 to be described later. Such a function may be realized by an application program running on an operating system.

In this embodiment, instead of specifying the departure time and/or arrival time, the itinerary search unit 1021 specifies a time that becomes a deadline to arrive at the destination. A specific example will be described later.

The storage unit 103 is a unit configured to store information, and is composed of a storage medium such as a RAM, a magnetic disk, a flash memory, or the like.

The input and output unit 104 is an interface for presenting information to a user and receiving the input of information from the user. The input and output unit 104 is configured to include, for example, a display device and a touch panel.

Now, the configuration of the itinerary server 200 will be described.

The itinerary server 200 is a device for generating a route connecting between a specified departure place and a specified destination and a movement schedule for moving on the route, based on itinerary search requests received from a plurality of user terminals 100.

Here, the generation of a movement schedule will be described.

Figure 2:
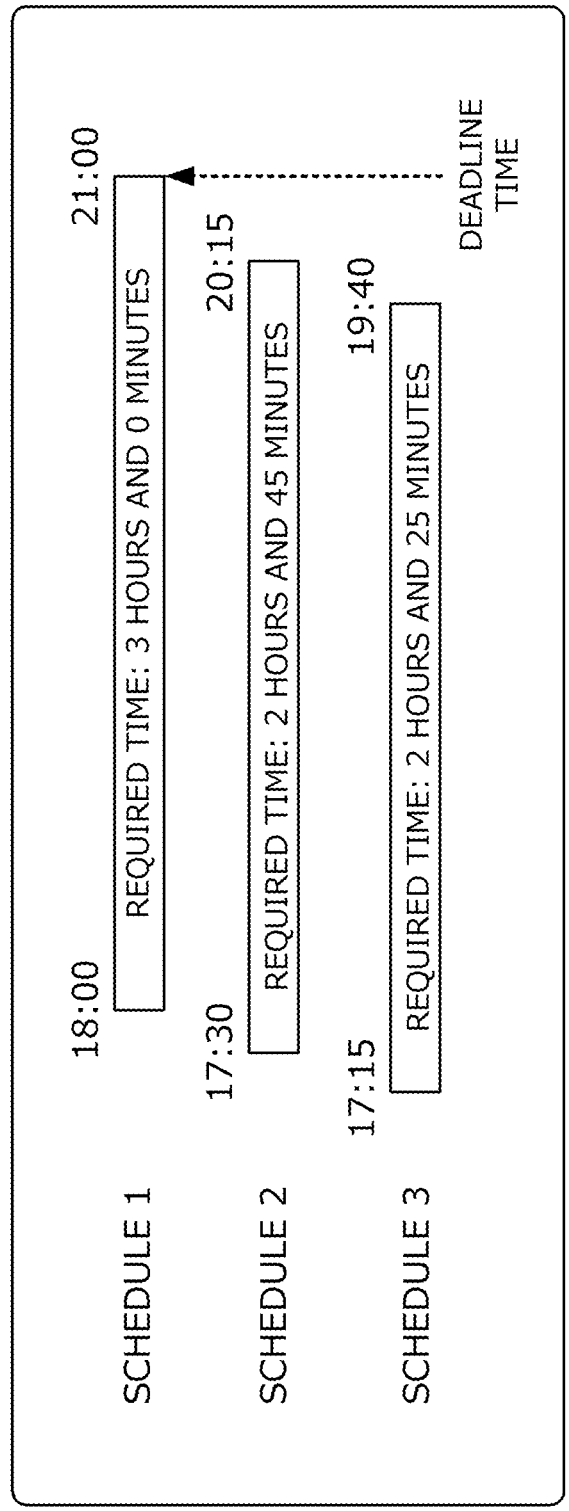
FIG. 2 is an example of a movement schedule at the time of moving on a predetermined route.

The itinerary server 200 according to this embodiment generates the route connecting between the departure place and the destination, and thereafter calculates an optimal schedule at the time of moving on the route. FIG. 2 is a view illustrating an example of a schedule at the time of moving on a predetermined route.

Here, a deadline time is a time that becomes a deadline to arrive at the destination and is specified by the user. For example, if the specified deadline time is 21:00, the itinerary server 200 generates a movement schedule that allows the user to arrive at the destination by 21:00.

There exist a plurality of schedules at the time of moving on the route connecting between the departure place and destination. In the example illustrated in this figure, there are exemplified schedule 1 for departing the departure place just at 18:00, schedule 2 for departing the departure place at 17:30, and schedule 3 for departing the departure place at 17:15. Here, note that In the illustrated example, it is assumed that a standard required travel time of the route (a travel time in the case where there is no traffic jam) is exactly 2 hours.

The time required for a route varies depending on the time of the day when the route is passed. For example, in the case of moving or traveling according to the schedule 1, it takes 3 hours to move because of a traffic congestion time zone in the evening.

On the other hand, if the schedule is changed to advance the departure time, the required travel time may be shortened because the user can pass through the route while the traffic jam is light. In the illustrated example, by departing at 17:30, the required travel time can be shortened by 15 minutes as compared with the schedule 1. Similarly, by departing at 17:15, the required travel time can be shortened by 35 minutes as compared with the schedule 1.

The itinerary server 200 according to the present embodiment selects a movement schedule meeting a time requirement from among those schedules that can be set on the assumption that the user can arrive at the destination by the deadline time, and provides the movement schedule to the user. The time requirement may be "the required travel time is the shortest", or "the required travel time is shorter than a threshold value set for each route".

Hereinafter, the configuration of the itinerary server 200 for realizing such a function will be described.

The itinerary server 200 is configured to include a communication unit 201, a control unit 202, and a storage unit 203.

The communication unit 201 is a communication interface for communicating with the user terminal 100 and the traffic information server 300 via a network, similar to the communication unit 101.

The control unit 202 is a unit configured to control the itinerary server 200. The control unit 202 is composed of a CPU, for example.

The control unit 202 includes, as functional modules, a route generation unit 2021, a traffic information obtaining unit 2022, and an itinerary generation unit 2023. Each of the functional modules may be realized by executing a program stored in the storage unit such as a ROM by the CPU.

In response to an itinerary search request obtained from the user terminal 100, the route generation unit 2021 searches for a route connecting between the specified departure place and the specified destination. The route search can be performed, for example, by a known method on the basis of road data (described later) stored in the storage unit 203 to be described later.

The traffic information obtaining unit 2022 obtains data on road traffic conditions (hereinafter also referred to as traffic congestion data) from the traffic information server 300. In this embodiment, the traffic congestion data is data representing an average vehicle speed for each road link by time zone. FIG. 3A illustrates an example of congestion data. In this example, the average vehicle speed for each road link is defined by time zone and day of the week.

The itinerary generation unit 2023 generates a movement schedule corresponding to a route generated by the route generation unit 2021. Specifically, based on the road data and the traffic congestion data stored, a travel time required when the vehicle travels on the route generated by the route generation unit 2021 is calculated, and a movement schedule that allows the user to arrive at the destination by the specified deadline time and satisfies the time requirement is generated.

Detailed processing performed by the itinerary generation unit 2023 will be described later.

The storage unit 203 is a unit configured to store information, and is composed of a storage medium such as a RAM, a magnetic disk, a flash memory, or the like.

The above-mentioned congestion data and road data are stored in the storage unit 203. The road data is data in which a connection relation of each road link, an extension (distance) of each road link, a standard required time of each road link, and the like are defined. The route generation unit 2021 according to this embodiment generates a route using the road data stored in the storage unit 203.

FIG. 3B is an example of road data. In this example, the distance and the standard time required for each road link are defined (the connection relationship between the road links is omitted). By using the road data stored in the storage unit 203, it is possible to calculate the required time in the case where the vehicle travels on a route composed of a set of a plurality of links. Further, a required time in an optional time zone can be calculated by considering the traffic congestion data.

Next, the configuration of the traffic information server 300 will be described.

The traffic information server 300 is a server device that provides the traffic congestion data. The traffic information server 300 includes a communication unit 301, a control unit 302 and a storage unit 303.

The communication unit 301 is a communication interface for communicating with the itinerary server 200 via a network, similar to the communication unit 201.

The control unit 302 is a unit configured to control the traffic information server 300. The control unit 302 is composed of a CPU, for example.

The control unit 302 includes a data collection unit 3021 and a data provision unit 3022 as functional modules. Each functional module may be realized by executing a program stored in a storage unit such as a ROM by the CPU.

The data collection unit 3021 collects data on the road traffic conditions. The data may be collected, for example, from devices installed by road administrators or police organizations (e.g., vehicle detectors, roadside devices, etc.). The data thus collected is stored in the storage unit 303.

The data provision unit 3022 generates and provides congestion data indicating the degree of congestion for each road link based on a request from the itinerary server 200. Based on the data collected by the data collection unit 3021, the data provision unit 3022 generates statistical data representing the degree of congestion by time zone or day of the week as illustrated in FIG. 3A, and provides the statistical data to the itinerary server 200.

Although an example of FIG. 3A exemplifies an average vehicle speed, other types of data may be provided as long as the itinerary server 200 can calculate the required time. In addition, in the example of FIG. 3A, the statistical data is exemplified, but the congestion data may be data before statistical procedures are performed.

The storage unit 303 is a unit configured to store information, and is composed of a storage medium such as a RAM, a magnetic disk, a flash memory, or the like.

Figure 4:
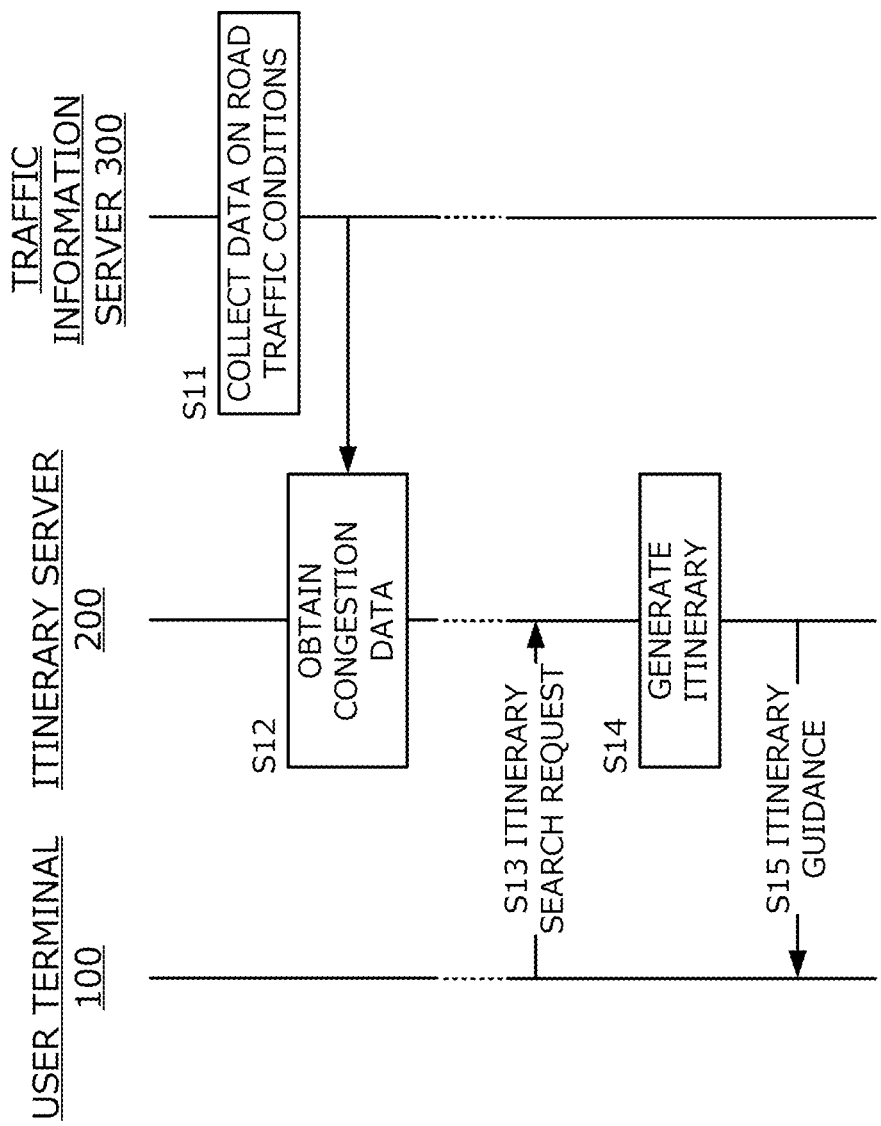
FIG. 4 is a schematic diagram of processings performed by a user terminal, an itinerary server and a traffic information server.

Then, an outline of the processings performed by the user terminal 100, the itinerary server 200, and the traffic information server 300 will be described with reference to FIG. 4.

First, the traffic information server 300 (data collection unit 3021) collects and stores the data on the road traffic conditions (step S11). The itinerary server 200 (traffic information obtaining unit 2022) obtains traffic congestion data from the traffic information server 300 (data provision unit) (step S12). Steps S11 and S12 are performed periodically while the system is in operation.

When the user performs an itinerary search through the user terminal 100, an itinerary search request is sent to the itinerary server 200 in step S13. The operation of the itinerary search can be performed, for example, through a dedicated application. The itinerary search request includes data indicating a time constraint (hereinafter, a constraint condition) in addition to a departure place and a destination. The constraint condition is a condition to be satisfied in generating the itinerary, and in this example, it is the deadline time, i.e., the last acceptable time to arrive at the destination.

The itinerary server 200 that received the itinerary search request generates an itinerary that matches the condition (step S14), and transmits it to the user terminal 100 (step S15).

Figure 5:
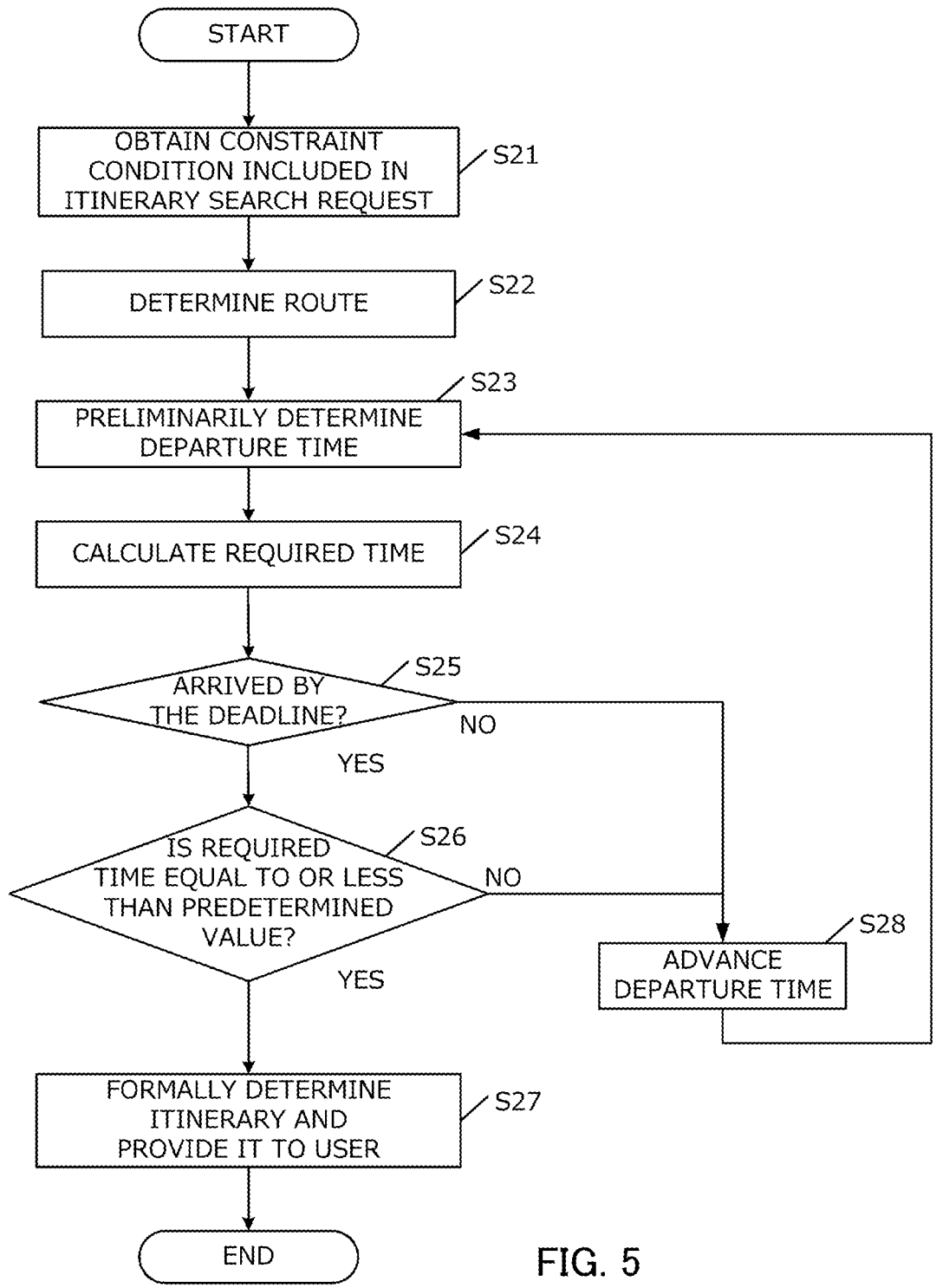
FIG. 5 is a flowchart of itinerary generation processing performed by the itinerary server.

The processing in which the itinerary server 200 generates the itinerary will be described in more detail with reference to FIG. 5. The processing illustrated in FIG. 5 starts at the timing of receiving the itinerary search request from the user terminal 100.

First, in step S21, the itinerary generation unit 2023 obtains a constraint condition (deadline time) included in the itinerary search request.

Then, in step S22, the route generation unit 2021 determines a route based on the departure place and the destination included in the itinerary search request. The route may be the most reasonable route under the condition that congestion is not taken into consideration.

Subsequently, in step S23, the itinerary generation unit 2023 provisionally determines the departure time. In the first processing, the departure time is determined at which it can be estimated that the user will be able to arrive at the destination so as to meet the deadline time.

In step S24, the itinerary generation unit 2023 calculates the required time in the case where the user leaves the departure place at the departure time determined in step S23. The required time can be calculated based on the traffic congestion data and the road data stored in the storage unit 203. For example, the required time can be obtained by calculating and summing the times required for passing through respective individual road links included in the route using a distance and an average vehicle speed for each road link.

A tentative movement schedule is determined by the processings of steps S23 and S24.

In step S25, the itinerary generation unit 2023 determines whether or not the destination can be reached by the deadline time. In cases where the arrival time included in the tentative movement schedule exceeds the deadline time, the processing proceeds to step S28, in which the departure time is advanced. On the other hand, in cases where the arrival time does not exceed the deadline time, the processing proceeds to step S26.

In step S26, the itinerary generation unit 2023 determines whether or not the calculated required time is equal to or less than a predetermined value determined for each route.

For example, in cases where a standard time required for a determined route is A minutes, the predetermined value can be set to (A+B) minutes. In this case, the value B may be an integer determined based on the value A. For example, in cases where the standard time required for the determined route is 30 minutes, the predetermined value can be set to (30+10=40) minutes.

Alternatively, the predetermined value may be set to (A×B) minutes. In this case, the value B may be a real number that is equal to or more than 1 and is determined based on the value A. For example, when the standard time required for the determined route is 30 minutes, the predetermined value may be (30×1.2=36) minutes.

The predetermined value is a threshold value for determining whether or not the tentative movement schedule is adopted. That is, when the required time for a certain movement schedule exceeds the predetermined value, it is determined that the loss due to traffic congestion is large, and the movement schedule is discarded.

The predetermined value for each route may be appropriately set based on the standard time required for the route.

In cases where the required time calculated exceeds the predetermined value, the processing proceeds to step S28, in which the departure time is advanced. On the other hand, in cases where the calculated required time is equal to or less than the predetermined value, the processing proceeds to step S27.

In step S27, the itinerary generation unit 2023 determines the generated tentative movement schedule as a formal one, and transmits it to the user terminal 100. Thus, the route and movement schedule thus determined are provided to the user through the user terminal 100.

As described above, in the system according to the first embodiment, a movement schedule is searched for in which the required time meets the condition within the range that a user can arrive at the destination by the deadline time. According to such a configuration, it is possible to obtain a movement schedule that requires less labor for driving. That is, it is possible to respond to a request from the user who wants to give priority to reducing the labor required for a driver rather than arriving at a desired time.

In this embodiment, in step S26, it is determined whether or not the required time exceeds the predetermined value, but it may be determined, for example, based on the degree of congestion on the route whether or not to adopt the movement schedule tentatively determined.

In addition, in cases where in the middle of the route, a time to stop the movement occurs due to resting, staying, etc., a required time may be calculated by excluding the stop time. In other words, in cases where a route connecting between the departure place and the destination is composed of a plurality of trips, a sum total of the times required for the respective trips may be calculated.

Modification of the First Embodiment

In the above-mentioned first embodiment, when a movement schedule is determined, only the deadline time is set as the constraint condition but a limit may be set on the departure time.

For example, it is known that leaving late at night or early in the morning can avoid the traffic congestion that occurs during the day, but it is considered that if the departure time is advanced without limit, a schedule that departs at midnight may be proposed, which would be an additional burden on the driver. Therefore, it may also be possible to include a time at which departure is possible (hereinafter referred to as "possible departure time") in the constraint condition, and to determine in step S25 whether or not a movement schedule can be accommodated from the possible departure time to the deadline time (within a predetermined time range). The possible departure time may be specified by the user through the user terminal 100, for example.

Second Embodiment

In the above-mentioned first embodiment, a movement schedule is determined based on a required time and a deadline time corresponding to a route. In contrast, in a second embodiment, a movement schedule is determined by first dividing a route into a first trip and a second trip, and then, further taking into consideration an interval between the first and second trips.

The route in the second embodiment is composed of a first trip toward a destination and a second trip back from a destination.

The movement schedule in the second embodiment is composed of a time to start the first trip (i.e., a time to leave a departure place), a time to finish the first trip (a time to arrive at a stay place), a time to start the second trip (a time to leave the stay place), and a time to finish the second trip (a time to arrive at the destination). Here, note that the departure place and the destination are not necessarily the same point.

In the second embodiment, the first trip (from the departure place to the stay place) is referred to as an outward trip, and the second trip (from the stay place to the destination) is referred to as a return trip.

Also, in the second embodiment, the itinerary server 200 generates a movement schedule that optimizes (1) a required time for the first trip, (2) a stay time in the stay place, and (3) a required time for the second trip.

Figure 6:
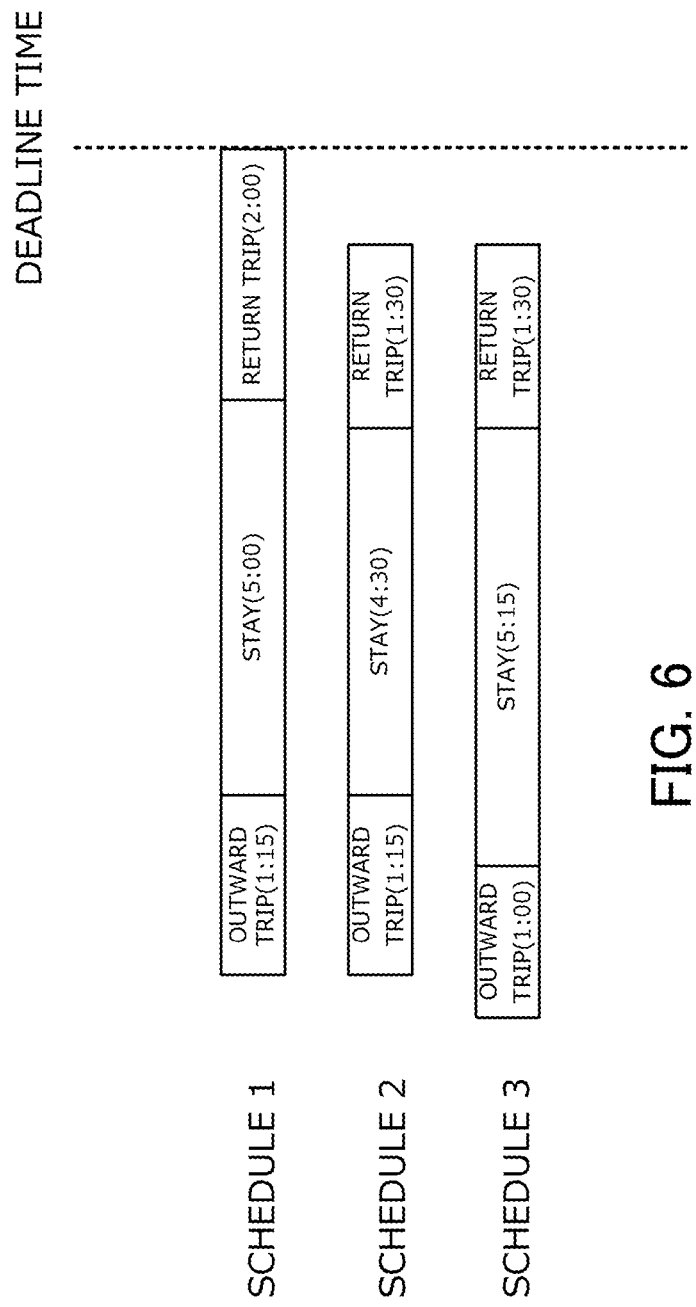
FIG. 6 is a view illustrating the relation between a time required for an outward trip, a stay time, and a time required for a return trip.

FIG. 6 is a diagram illustrating the relationship between the time required for the outward trip, the stay time, and the time required for the return trip.

For example, schedule 1 is assumed to be as a movement schedule that arrives at the deadline time.

In such a case, for example, it may be possible to shorten the time required for the return trip by terminating the stay earlier (schedule 2). In addition, by starting the outward trip earlier, the time required for the outward trip may be shortened, as a result of which the stay time may be extended (schedule 3).

The itinerary server 200 according to the second embodiment optimizes the entire schedule by individually determining the departure times for the outward trip and the return trip. Specifically, a movement schedule is obtained in which the time spent on the movement or travel is shorter and the stay time in the stay place is longer.

Figure 7:
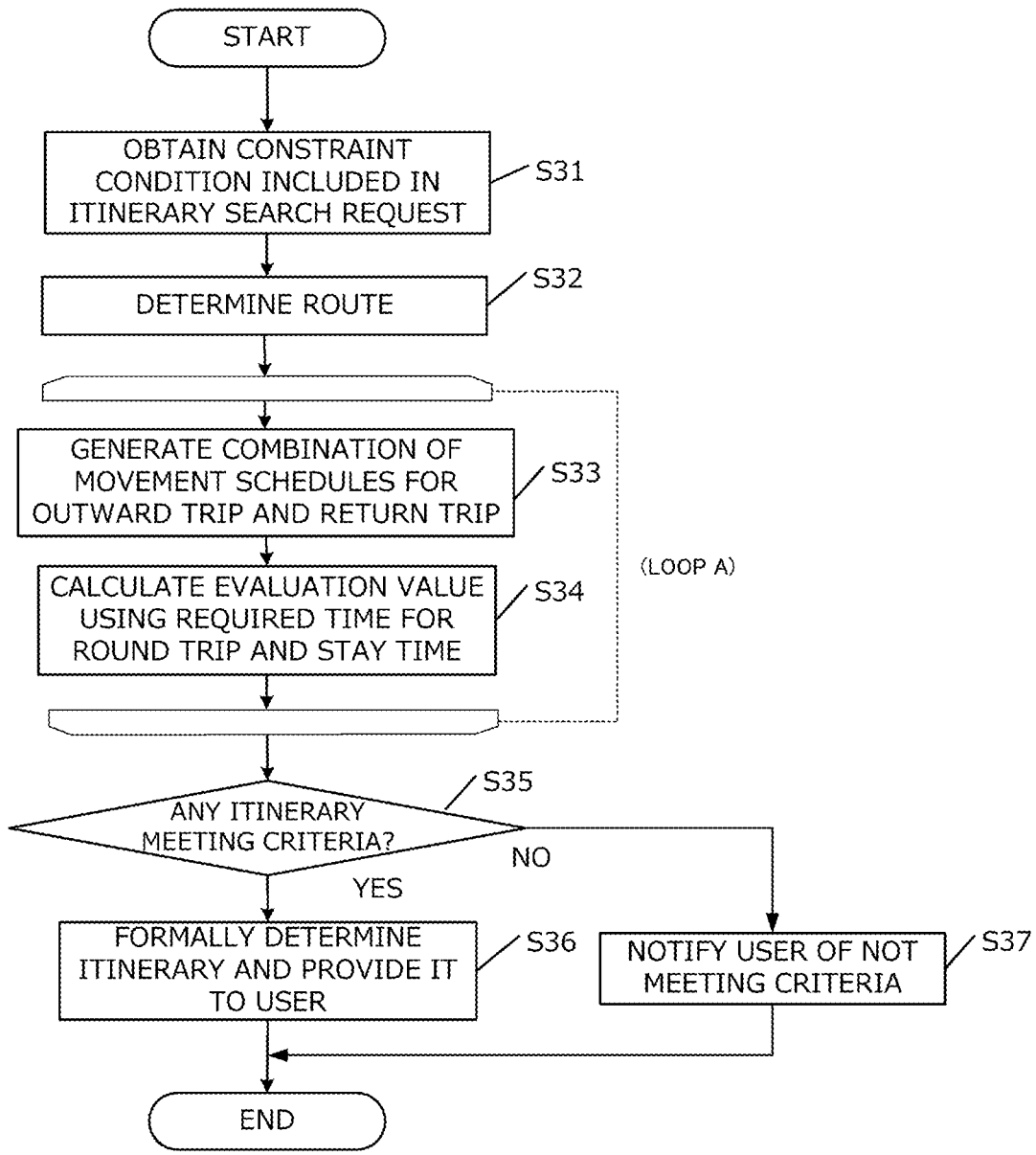
FIG. 7 is a flowchart of itinerary generation processing in a second embodiment of the present disclosure.

FIG. 7 is a flowchart of the processing of generating an itinerary to be performed by the itinerary server 200 in the second embodiment. The processing illustrated in FIG. 7 starts at the timing of receiving the itinerary search request from the user terminal 100.

First, in step S31, the itinerary generation unit 2023 obtains a constraint condition included in the itinerary search request. In the second embodiment, the constraint condition includes a deadline time and a possible departure time.

Then, in step S32, the route generation unit 2021 determines a route by the same method as in step S22.

In step 33, the route generation unit 2021 generates a combination of movement schedules for outward and return trips that can be taken between the possible departure time and the deadline time. Specifically, by shifting the departure time for the outward trip and the departure time for the return trip by one minute at a time, the route generation unit 2021 generates combinations which have not been processed and in which the movement is completed between the possible departure time and the deadline time. The required time can be calculated by the same method as in the first embodiment.

The movement schedule generated here includes the following information:
  a departure time for the outward trip;
  a arrival time for the outward trip;
  a departure time for the return trip; and
  an arrival time for the return trip.

In addition, in this way, it is possible to calculate the required time for the outward trip, the stay time in the stay place, and the required time for the return trip.

In step 34, the route generation unit 2021 calculates an evaluation value by using the required times (i.e., the required time for the outward trip and the required time for the return trip) and the stay time thus calculated. The evaluation value is a value which becomes higher as the required times for the outward trip and the return trip becomes shorter, and which becomes higher as the stay time in the stay place becomes longer. The criteria or formula for calculating the evaluation value may have been stored in advance.

The processings of steps 33 and 34 are carried out for all the combinations generated (loop A). The loop A ends at the time when there is no longer a reasonable one among unprocessed movement schedules. For example, an extremely short stay time in the stay place, a stay time shorter than an average stay time, an extremely long stay time, etc., may be excluded as being unreasonable.

In step S35, from among a plurality of movement schedules generated, the ones whose evaluation values meet the criteria (e.g., the evaluation values are equal to or greater than a threshold value) are specified.

If an evaluation value meets the criteria but a movement schedule generated falls under any of the following, a corresponding movement schedule may be treated as not meeting the criteria:
  the required time for the outward trip exceeds a threshold value set for the outward trip;
  the stay time spent in the stay place is out of a range set for the stay place (too short or too long); and
  the required time for the return trip exceeds a threshold value set for the return trip.

In cases where a movement schedule meeting the criteria is extracted in step 35, the movement schedule is transmitted to the user terminal 100 as a formal itinerary (step 36). Here, note that if there are a plurality of candidates, the candidates may be presented to the user together with their evaluation values, the calculation basis of the evaluation values, and the like. Also, note that in cases where any movement schedule meeting the criteria is not extracted in step 35, that fact is transmitted to the user terminal 100 (step 37).

As described above, according to the second embodiment, it is possible to calculate a movement schedule in which the required time in the outward trip, the stay time in the stay place, and the required time in the return trip are balanced with one another.

Modification 1 of the Second Embodiment

In the above-mentioned second embodiment, all the combinations of movement schedules for the outward and return trips that can be taken between the possible departure time and the deadline time are generated and evaluated, but trips may be specified in chronological order.

Figure 8:
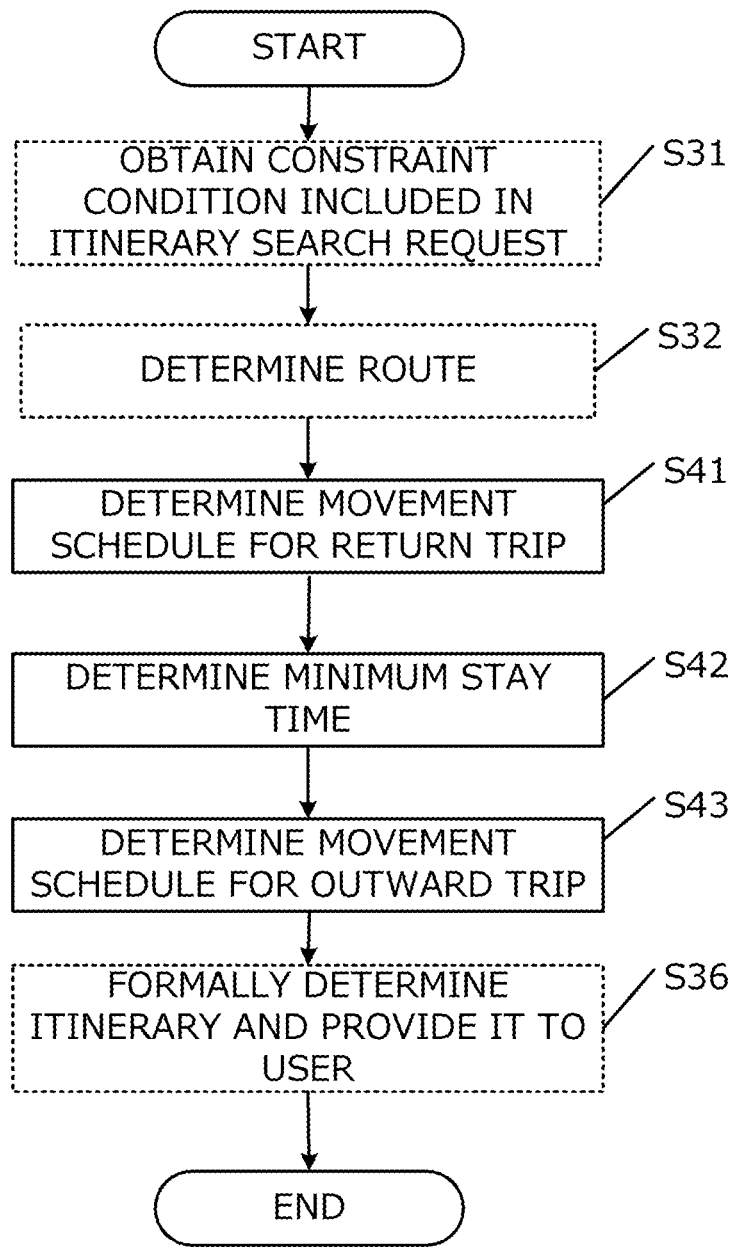
FIG. 8 is a flowchart of itinerary generation processing in a modification of the second embodiment of the present disclosure.

FIG. 8 is a flowchart of the processing in which the itinerary server 200 generates an itinerary in this modification. The steps illustrated by broken lines are the same as those in the second embodiment, and hence, the explanation thereof is omitted.

In step 41, a movement schedule corresponding to a trip is determined by the same processings as in steps S23 to S26 and S28, but the difference is that an object to be processed is the return trip (second trip). It is assumed that a movement schedule in the return trip can arrive at the destination by the deadline time, and that a required time meets the condition.

In step 42, a minimum stay time in the stay place is determined. The minimum stay time may be based on a user's intention, or it may be determined based on an average stay time in the stay place.

In step 43, the movement schedule corresponding to the outward trip (first trip) is determined by the same processing as in the return trip. The movement schedule in the return trip is such that the departure time is later than the possible departure time, and the required time meets the condition. Note that if the departure time for the outward trip is advanced, the stay time will be extended.

In this case, when the movement schedule in which the departure time is earlier than the possible departure time is calculated, the stay time may be shortened based on a user's intention, and the processing of step 43 may be performed again.

Modification 2 of the Second Embodiment

In the above-mentioned second embodiment, the number of stay places is one, but there may be a plurality of stay places.

For example, the itinerary server 200 may determine a route via two or more stay places based on an itinerary search request. That is, the route may consist of three or more trips.

In the case of this modification, an evaluation value for a movement schedule can be calculated based on a required time in each trip and stay times in two or more stay places. According to this modification, it is possible to obtain an evaluation value which becomes higher as a sum total of the required times for the individual trips becomes shorter, and as a sum total of the stay times in the individual stay places becomes longer.

Third Embodiment

In the above-mentioned first and second embodiments, after a single route is determined, a movement schedule corresponding to the route is determined. In contrast, a third embodiment is such that a plurality of routes are first generated and a movement schedule is then evaluated for each route.

Figure 9:
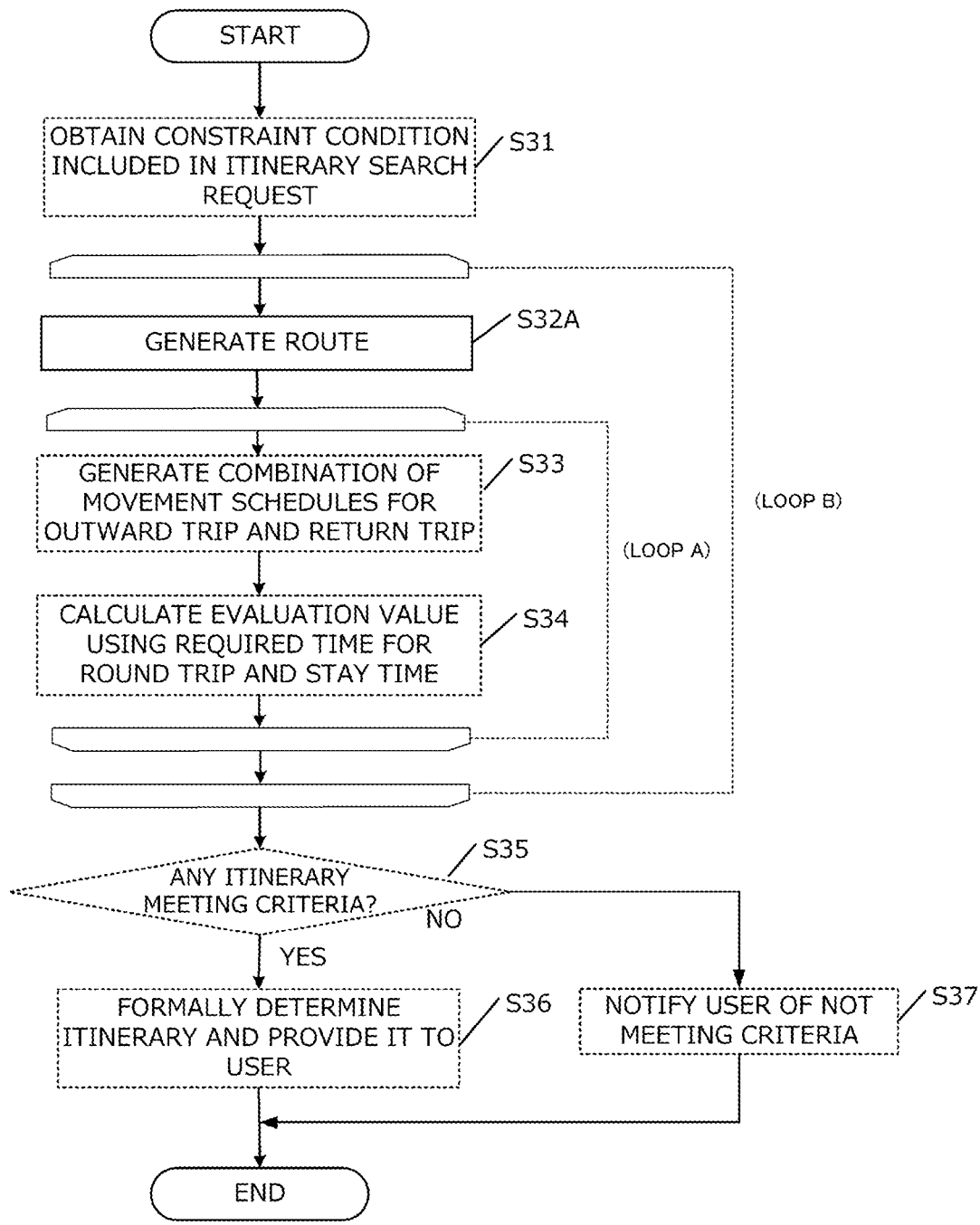
FIG. 9 is a flowchart of itinerary generation processing in a third embodiment of the present disclosure.

FIG. 9 is a flowchart of the processing of generating an itinerary to be performed by the itinerary server 200 in the third embodiment. The steps illustrated by broken lines are the same as those in the second embodiment, and hence, the explanation thereof is omitted.

In the third embodiment, in step S32A, the route generation unit 2021 determines a route based on a departure place and a destination included in an itinerary search request. In cases where there are a plurality of route candidates, the route generation unit 2021 selects the plurality of candidates in a sequential manner (loop B).

In steps 33 and 34, the same processings as in the second embodiment are performed for the selected route. That is, the route generation unit 2021 generates combinations of movement schedules for the outward and return trips that can be taken between the possible departure time and the deadline time, and calculates an evaluation value for each of them.

The processings of steps 33 and 34 are carried out for all the combinations generated (loop A). The loop A ends at the time when there is no longer a reasonable one among unprocessed movement schedules.

Also, the loop B ends at the time when there is no longer a reasonable one among unprocessed routes.

The processings after step 35 are the same as in the second embodiment.

According to the third embodiment, a plurality of routes that can be taken by a user moving between a departure place and a destination are obtained and evaluated respectively, as a result of which it is possible to search for a more appropriate itinerary.

Fourth Embodiment

In the first to third embodiments, a plurality of itineraries that can be taken by the user are obtained, and each of the itineraries is evaluated based on time. In contrast, a fourth embodiment is such that the itineraries are each evaluated by further using the level of difficulty in driving for each route.

Figure 10:
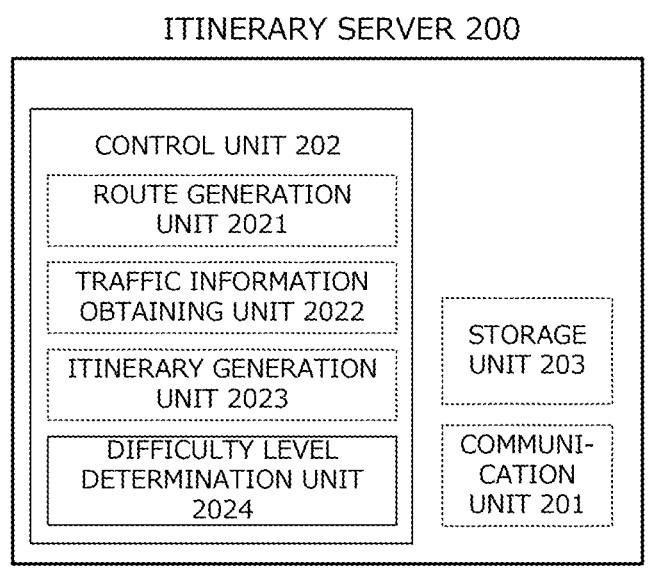
FIG. 10 is a system configuration view of an itinerary server according to a fourth embodiment of the present disclosure.

FIG. 10 is a system configuration view of the itinerary server 200 according to the fourth embodiment.

In the fourth embodiment, the control unit 202 included in the itinerary server 200 is configured to include a difficulty level determination unit 2024 that determines the level of difficulty in driving.

The difficulty level determination unit 2024 is a module that obtains information for specifying a route (or trip) (e.g., a set of road links) and outputs the level of difficulty in driving on the route (trip) by a numerical value.

In addition, in the fourth embodiment, data on the factors affecting the level of difficulty in driving is stored in the storage unit 203 for each road link. FIG. 11 is an example of road data in this embodiment. The factors affecting the level of difficulty in driving are, for example, the number of lanes, the width of each road, the presence or absence of sidewalks, etc., but may be other factors.

Figure 12:
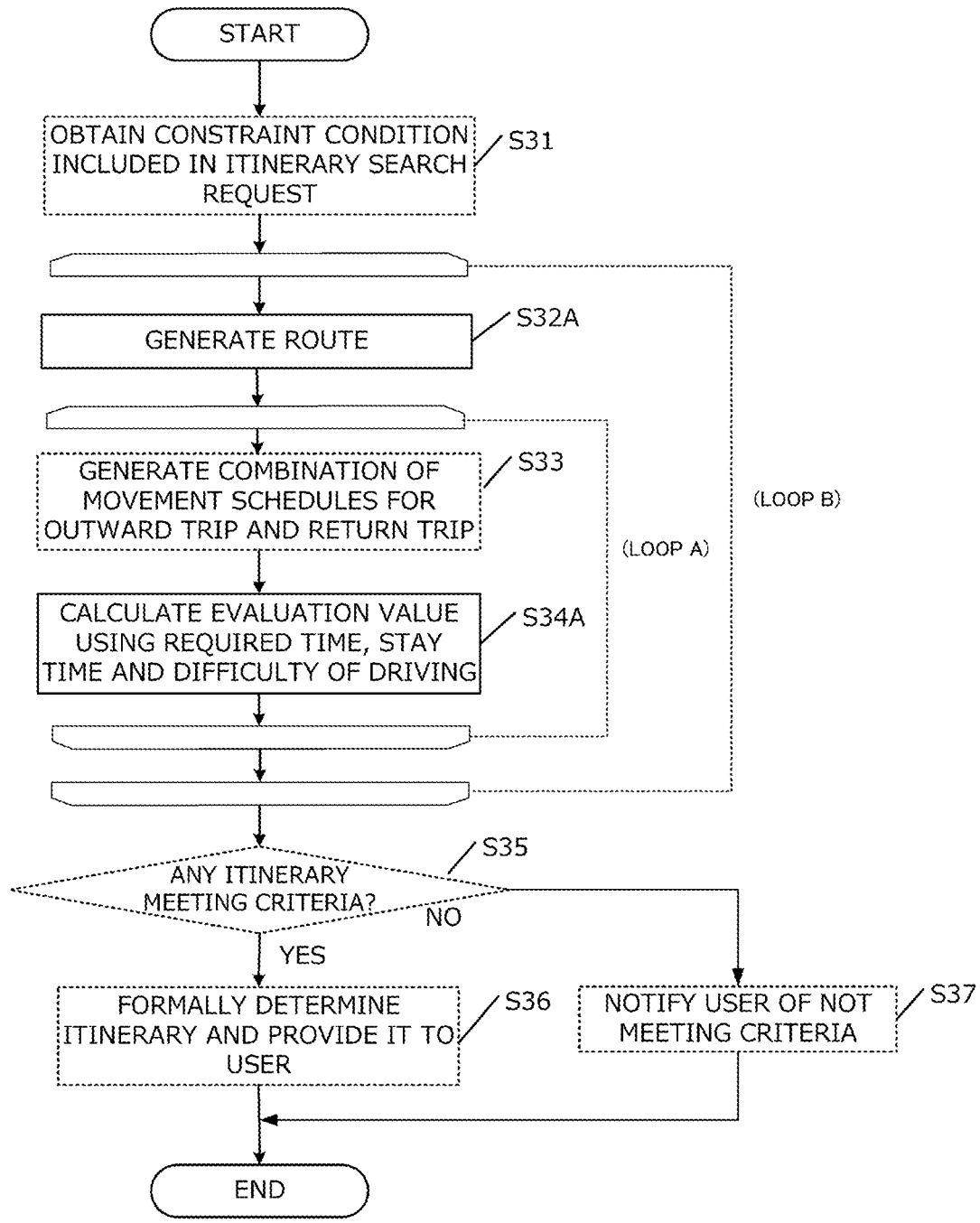
FIG. 12 is a flowchart of itinerary generation processing in the fourth embodiment of the present disclosure.

FIG. 12 is a flowchart of the processing of generating an itinerary to be performed by the itinerary server 200 in the fourth embodiment. The steps illustrated by broken lines are the same as those in the third embodiment, and hence, the explanation thereof is omitted. In the fourth embodiment, in step 34A, the itinerary generation unit 2023 calculates a first evaluation value by using the following information:
  a required time for the outward trip;
  a required time for the return trip; and
  a stay time in the stay place.

Moreover, the itinerary generation unit 2023 calculates a second evaluation value by using the following information:
  the level of difficulty in driving on the outward trip; and
  the level of difficulty in driving on the return trip.

Here, note that the itinerary generation unit 2023 obtains the level of difficulty in driving on the outward trip or the return trip through the difficulty level determination unit 2024.

The difficulty level determination unit 2024 calculates the level of difficulty in driving corresponding to a predetermined trip, for example, by the following formula:

the level of difficulty in driving=Σ road links (number of lanes×coefficient 1+road width×coefficient 2+existence of sidewalk×coefficient 3).

Here, the coefficients are each a weight for each factor. Each coefficient may be specified in advance by a user or may be a fixed value.

In the fourth embodiment, the itinerary generation unit 2023 calculates an evaluation value (second evaluation value) for the route based on the level of difficulty in driving. For example, in cases where the route includes a plurality of trips, the levels of difficulty in driving calculated for the respective individual trips can be summed up to obtain the second evaluation value.

Also, the second evaluation value thus calculated is combined with an evaluation value for a movement schedule (first evaluation value) to perform a comprehensive evaluation of the itinerary.

Here, note that it may also be possible to obtain from the user in advance which of the travel time, the stay time, and the level of difficulty in driving are considered important, and to assign weights to them when the evaluation values are calculated.

In addition, although information specific to each road link is illustrated in FIG. 11, the level of difficulty in driving may be corrected using information that is not specific to the road, such as driving time zones and weather to be forecasted. For example, when the vehicle is traveling at night, or when rainfall is predicted, a correction may be made to increase the level of difficulty in driving.

As described above, in the fourth embodiment, it is configured that the itinerary is evaluated by the ease of driving in addition to the required time and the stay time. With such a configuration, it is possible to select an itinerary that minimizes the labor required of the driver.

In the description of this fourth embodiment, the level of difficulty in driving is calculated by the illustrated formula, but such calculation may not be adopted unconditionally for an itinerary that meets the condition specified by the user. For example, it may be possible to add a condition such as "ignore itineraries that take place after sunset" or "ignore itineraries that pass through two-way traffic highways".

Modification

The above-described embodiments and modifications are merely examples, and the present disclosure may be appropriately modified and implemented within a range not departing from the gist thereof.

For example, the processings, units and devices described in the present disclosure may be performed in any combination as long as there is no technical contradiction.

Also, in the description of the embodiments and modifications, the itinerary server 200 accessed by the user terminal 100 has generated itineraries, but the generation of itineraries may be performed by anything other than the exemplified device. For example, it may be performed by a server device, a personal computer, a portable computer, or other general-purpose computer. In addition, the generation of itineraries may not necessarily be performed by a combination of a mobile terminal and a server device. For example, the processing performed by the user terminal 100 and the processing performed by the itinerary server 200 may be carried out by the same device.

In the description of the embodiments and modifications, data representing the level of traffic congestion in detail as illustrated in FIG. 3A is exemplified, but data indicating only the presence or absence of traffic congestion may be used. In this case, in a step of comparing a required time with a threshold value, it may be determined only whether or not there is a traffic congestion on a route.

In addition, the processing(s) explained as carried out by a single device may be carried out by a plurality of devices. Alternatively, the processing(s) explained as carried out by different devices may be carried out by a single device. In a computer system, whether each function is achieved by what kind of hardware configuration (server configuration) can be changed in a flexible manner.

The present disclosure can also be achieved by supplying a computer program to a computer that implements the functions explained in the above-mentioned embodiments and modifications, and by reading out and executing the program by one or more processors of the computer. Such a computer program may be supplied to the computer by a non-transitory computer readable storage medium that can be connected with a system bus of the computer, or may be supplied to the computer through a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, any type of medium suitable for storing electronic commands.

What is claimed is:

1. An information processing apparatus comprising:
   a storage unit configured to store congestion information for each road link by time zone; and
   a control unit configured to obtain information about a departure place, a destination and an arrival deadline from a user, and to determine a route connecting between the departure place and the destination and a movement schedule including a departure time and an estimated arrival time;
   wherein the control unit determines the movement schedule that allows a user to arrive at the destination by the arrival deadline and to move through the route in a required time shorter than a predetermined value set for each route,
   wherein the control unit obtains a candidate of the movement schedule, calculates the required time corresponding to the movement schedule candidate by using the traffic congestion information, and gives an evaluation value to the candidate based on the required time calculated, and
   wherein the route includes a first trip and a second trip; and
   the control unit gives a higher evaluation value to the candidate, as an interval between the first trip and the second trip is longer.

2. The information processing apparatus according to claim 1, wherein
   the predetermined value is determined based on a standard required time corresponding to the route.

3. The information processing apparatus according to claim 1, wherein
   the control unit determines the movement schedule in such a manner that the departure time and the estimated arrival time fall within a predetermined time range that ends at the arrival deadline.

4. The information processing apparatus according to claim 1, wherein
   the control unit obtains the candidate of the movement schedule by setting the arrival deadline as the estimated arrival time, and advances, when the required time obtained exceeds the predetermined value, the departure time until the required time falls below the predetermined value.

5. The information processing apparatus according to claim 1, wherein
   the control unit adopts the candidate of the movement schedule for which the evaluation value is equal to or greater than a predetermined value.

6. The information processing apparatus according to claim claim 1, wherein
   the control unit gives a higher evaluation value to the candidate, as a sum total of times required for the first trip and the second trip is shorter.

7. The information processing apparatus according to claim 1, wherein
   the control unit obtains a candidate of the route, and gives a second evaluation value to the candidate of the route based on a plurality of evaluation criteria.

8. The information processing apparatus according to claim 7, wherein
   the control unit assigns a weight to each of the plurality of evaluation criteria based on a user's specification.

9. The information processing apparatus according to claim 7, wherein
   the control unit presents a result of the evaluation based on the plurality of evaluation criteria to the user.

10. An information processing method comprising:
- an obtaining step configured to obtain congestion information for each road link by time zone; and
- a determination step configured to obtain information about a departure place, a destination and an arrival deadline from a user, and to determine a route connecting between the departure place and the destination and a movement schedule including a departure time and an estimated arrival time;
- wherein in the determination step, the movement schedule is determined that allows a user to arrive at the destination by the arrival deadline and to move through the route in a required time shorter than a predetermined value set for each route,
- wherein in the determination step, the candidate of the movement schedule is obtained, the required time corresponding to the movement schedule candidate is calculated by using the traffic congestion information, and an evaluation value is given to the candidate based on the required time calculated, and
- wherein the route includes a first trip and a second trip; and
- in the determination step, a higher evaluation value is given to the candidate, as an interval between the first trip and the second trip is longer.

11. The information processing method according to claim 10, wherein
- the predetermined value is determined based on a standard required time corresponding to the route.

12. The information processing method according to claim 10, wherein
- in the determination step, the movement schedule is determined in such a manner that the departure time and the estimated arrival time fall within a predetermined time range that ends at the arrival deadline.

13. The information processing method according to claim 10, wherein
- in the determination step, the candidate of the movement schedule is obtained by setting the arrival deadline as the estimated arrival time, and when the required time obtained exceeds the predetermined value, the departure time is advanced until the required time falls below the predetermined value.

14. A non-transitory computer readable storing medium recording a computer program for causing a computer to perform an information processing method comprising:
- an obtaining step configured to obtain congestion information for each road link by time zone; and
- a determination step configured to obtain information about a departure place, a destination and an arrival deadline from a user, and to determine a route connecting between the departure place and the destination and a movement schedule including a departure time and an estimated arrival time;
- wherein in the determination step, the movement schedule is determined that allows a user to arrive at the destination by the arrival deadline and to move through the route in a required time shorter than a predetermined value set for each route,
- wherein in the determination step, the candidate of the movement schedule is obtained, the required time corresponding to the movement schedule candidate is calculated by using the traffic congestion information, and an evaluation value is given to the candidate based on the required time calculated, and
- wherein the route includes a first trip and a second trip; and
- in the determination step, a higher evaluation value is given to the candidate, as an interval between the first trip and the second trip is longer.

\* \* \* \* \*